(12) United States Patent
Wang et al.

(10) Patent No.: US 11,467,448 B2
(45) Date of Patent: Oct. 11, 2022

(54) BACK LIGHT UNIT, DISPLAY UNIT AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Dake Wang, Beijing (CN); Tianma Li, Beijing (CN); Liang Li, Beijing (CN); Guohui Wang, Beijing (CN); Qijun Zhang, Beijing (CN); Xuefeng Ding, Beijing (CN)

(73) Assignees: Chengdu BOE Optoelectronics Technology Co., Ltd., Sichuan (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/316,733

(22) Filed: May 11, 2021

(65) Prior Publication Data
US 2022/0137461 A1 May 5, 2022

(30) Foreign Application Priority Data
Oct. 29, 2020 (CN) .......................... 202011183103.8

(51) Int. Cl.
*G02F 1/13357* (2006.01)
*G02F 1/1333* (2006.01)
*G02F 1/1335* (2006.01)

(52) U.S. Cl.
CPC .. *G02F 1/133608* (2013.01); *G02F 1/133314* (2021.01); *G02F 1/133325* (2021.01); *G02F 1/133605* (2013.01); *G02F 1/133607* (2021.01)

(58) Field of Classification Search
CPC .................... G02F 1/133608; G02F 1/133314
See application file for complete search history.

(56) References Cited

U.S. PATENT DOCUMENTS

2012/0287368 A1* 11/2012 Que .................... G02B 6/0086
220/676
2015/0042898 A1* 2/2015 Ikuta .................... G06F 1/1601
348/790

(Continued)

FOREIGN PATENT DOCUMENTS

CN     106125405 A   * 11/2016   ....... G02F 1/133308

OTHER PUBLICATIONS

English Translation of Tagn CN 106125405, published Nov. 2016 (Year: 2016).*

*Primary Examiner* — Evan P Dzierzynski
(74) *Attorney, Agent, or Firm* — Ling Wu; Stephen Yang; Ling and Yang Intellectual Property

(57) ABSTRACT

Provided is a back light unit, a display unit and a display apparatus. The back light unit is configured to be disposed on a side of a display panel away from a display side, and includes a back plate and a plastic frame. The back plate includes a bottom plate and a side plate connected to an edge of the bottom plate, and a step is formed on an inner side of the side plate. The step has a first side away from the bottom plate and a second side away from an outer side of the side plate. The plastic frame is supported on the first side surface of the step, and a supporting part is disposed on an end surface of the side plate away from the bottom plate.

19 Claims, 6 Drawing Sheets

(56) References Cited

U.S. PATENT DOCUMENTS

| | | | |
|---|---|---|---|
| 2015/0055368 A1* | 2/2015 | Chu | G02B 6/0088 |
| | | | 362/609 |
| 2018/0106959 A1* | 4/2018 | Zeng | G02B 6/009 |
| 2020/0183217 A1* | 6/2020 | Liao | G02F 1/133524 |
| 2020/0201121 A1* | 6/2020 | Huang | G02F 1/133608 |
| 2021/0278725 A1* | 9/2021 | Xiao | G02F 1/133606 |

\* cited by examiner

BACK LIGHT UNIT, DISPLAY UNIT AND DISPLAY APPARATUS

CROSS-REFERENCE TO RELATED APPLICATION

The present application claims the priority of Chinese Patent Application No. 202011183103.8 filed to the CNIPA on Oct. 29, 2020, the content of which is hereby incorporated by reference.

TECHNICAL FIELD

Embodiments of the present disclosure relate to, but are not limited to, the technical field of display, in particular to a back light unit, a display unit and a display apparatus.

BACKGROUND

The liquid crystal display apparatus includes a liquid crystal display panel and a back light unit, etc. The back light unit is disposed on a back side of the liquid crystal display panel and provides a light source for the liquid crystal display panel, including a back plate, a plastic frame, a light source, a light guide plate, an optical diaphragm, etc. In some liquid crystal display units, the liquid crystal display panel is attached to a cover plate on its display side, and the cover plate is fixed on the plastic frame by a double-sided adhesive (such as a VHB) when assembled with the back light unit. Due to the limitation of the processing technology, the flatness of a surface of the plastic frame attached to the cover plate is poor (taking 12.8 inches as an example, the minimum flatness may be 0.35 mm), which leads to a deformation of the liquid crystal display panel and a dark light leakage phenomenon after the cover plate is attached to the plastic frame, and the dark light leakage phenomenon will be more serious due to a tensile force of the double-sided adhesive.

SUMMARY

The following is a summary of subject matter described in detail herein. This summary is not intended to limit the protection scope of the claims.

An embodiment of the present disclosure provides a back light unit, a display unit and a display apparatus.

On one hand, a back light unit provided by an embodiment of the present disclosure is configured to be disposed on a side of a display panel away from a display side, and the back light unit includes a back plate and a plastic frame, wherein the back plate includes a bottom plate and a side plate connected to an edge of the bottom plate, a step is formed on an inner side of the side plate, and the step has a first side away from the bottom plate and a second side away from an outer side of the side plate. The plastic frame is supported on the first side surface of the step, a supporting part is disposed on an end surface of the side plate away from the bottom plate, and the supporting part is configured to support a cover plate disposed on the display side of the display panel.

Optionally, an end face of the side plate away from the bottom plate is provided with a plurality of bosses distributed along a circumferential direction of the side plate, the plurality of bosses are integrated with the back plate, and the supporting part includes the plurality of bosses.

Optionally, at least one of the bosses comprises a first boss disposed on an end face of the side plate away from the bottom plate and a second boss disposed on the first boss, and a surface of the second boss away from the bottom plate is configured to support the cover plate disposed on a display side of the display panel; or a surface of at least one of the bosses away from the bottom plate is a plane, and a surface of the boss away from the bottom plate is configured to support the cover plate disposed on the display side of the display panel.

Optionally, the cover plate is adhered to the end face of the side plate away from the bottom plate through a second adhesive layer, and a thickness of the second adhesive layer is a height difference between the end face of the side plate away from the bottom plate and the surface of the boss away from the bottom plate.

Optionally, the height difference between the end face of the side plate away from the bottom plate and the surface of the boss away from the bottom plate is 0.3 mm-0.4 mm.

Optionally, the end face of the side plate away from the bottom plate is provided with a first buffer layer, and the supporting part includes the first buffer layer.

Optionally, the plastic frame is adhered to a first side of the step through a first adhesive layer; or/and a side of the plastic frame facing the bottom plate is provided with a buckle, and the buckle is clamped in a clamping hole or a clamping groove disposed on the back plate.

Optionally, a circumferential edge of the side of the plastic frame facing the bottom plate is adhered and fixed on the first side of the step through the first adhesive layer, and an inner edge of the plastic frame protrudes from a second side of the step.

Optionally, a plurality of buckles are disposed along the circumferential direction of the plastic frame, a corresponding position of the back plate is provided with a clamping hole or a clamping groove, and a shape of the buckle is matched with shapes of the clamping hole or the clamping groove.

Optionally, a clamping part is formed at an end of the buckle clamped into the clamping hole, and the clamping part protrudes toward an inner side or an outer side of the plastic frame; an end of the clamping hole is located on the first side of the step, and the other end penetrates through the bottom plate in a direction parallel to the side plate; a clamping limiting step is formed at the other end of the clamping hole on the bottom plate or side plate; and when the buckle is clamped in the clamping hole, the clamping part is clamped in the clamping limiting step.

Optionally, the back light unit further includes a light source and a light guide plate, the light guide plate is fixed on the bottom plate, a light emitting surface of the light guide plate is disposed away from the bottom plate, and the light source is fixed on the second side of the step and located on the side of the light guide plate.

Optionally, the back light unit further includes a plurality of optical diaphragms, the plurality of optical diaphragms include a reflection sheet located between the light guide plate and the bottom plate, and a diffusion sheet and a prism sheet sequentially stacked on a side of the light guide plate away from the bottom plate. The prism sheet includes a lower prism sheet and an upper prism sheet stacked on the diffusion sheet.

Optionally, the back plate is made of metal, and the plastic frame is made of organic plastic.

Optionally, the side plate is disposed along the circumferential edge of the bottom plate and extends toward a side of the bottom plate, and a shape of the bottom plate is matched with a shape of the display panel.

On the other hand, a display unit provided by an embodiment of the present disclosure includes a display panel, a cover plate disposed on a display side of the display panel, and the back light unit described in any of the aforementioned embodiments, wherein the back light unit is disposed on a side of the display panel away from the display side, and the cover plate is supported on the supporting part.

Optionally, an end face of the side plate away from the bottom plate is provided with a plurality of bosses distributed along a circumferential direction of the side plate, the plurality of bosses are integrated with the back plate, and the supporting part includes the plurality of bosses; and the cover plate is in contact with a surface of the boss away from the bottom plate, and the cover plate is adhered to an end face of the side plate away from the bottom plate through a second adhesive layer.

Optionally, at least one of the bosses includes a first boss disposed on the end face of the side plate away from the bottom plate and a second boss disposed on the first boss, and a surface of the second boss away from the bottom plate is configured to support the cover plate disposed on the display side of the display panel; or a surface of at least one of the bosses away from the bottom plate is a plane, and a surface of the boss away from the bottom plate is configured to support the cover plate disposed on the display side of the display panel.

Optionally, a height difference between the surface of the boss away from the bottom plate and the end face of the side plate away from the bottom plate is 0.3 mm-0.4 mm.

Optionally, a side of the plastic frame away from the bottom plate is provided with a second buffer layer, and the second buffer layer is disposed opposite to the circumferential edge of the side of the display panel facing the bottom plate, and has a gap with the side of the display panel facing the bottom plate.

In another aspect, an embodiment of the present application provides a display apparatus including a display unit as described in any of the above embodiments.

Other aspects will become apparent upon reading and understanding accompanying drawings and the detailed description.

BRIEF DESCRIPTION OF DRAWINGS

The accompanying drawings are used to provide an understanding of the technical solution of the present application and form a part of the description. Together with the embodiments of the application, the accompanying drawings are used to explain the technical solution of the present application and do not constitute a limitation on the technical solution of the present application.

DETAILED DESCRIPTION

The technical solution of the present disclosure will be explained with reference to the accompanying drawings and through specific embodiments. The embodiments described herein are only used to explain the present disclosure, but not to limit the present disclosure.

Figure 1:
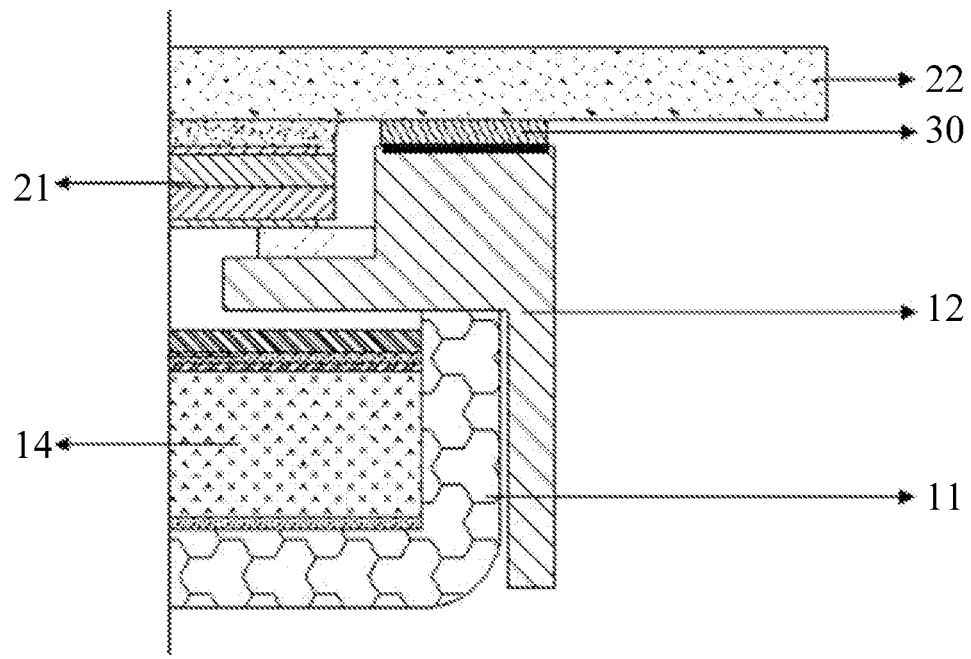
FIG. 1 is a schematic diagram of a structure of a liquid crystal display unit in some technologies.

In some vehicle-mounted liquid crystal display units, as shown in FIG. 1, a cover plate 22 and a liquid crystal display panel 21 are bonded by an optical clear resin (abbreviated as OCR) or an optical clear adhesive (abbreviate as OCA), and then assembled to a back light unit (BLU) 10. The assembly mode of the cover plate 22 and the BLU is through a very high bond (VHB) 30 fixed on a plastic frame (M/F) 12. Due to the limitation of the processing technology, the flatness of a surface of the plastic frame 12 attached to the cover plate 22 is poor (taking 12.8 inches as an example, the minimum flatness may be 0.35 mm), which leads to a deformation of the liquid crystal display panel 21 and a dark light leakage phenomenon after the cover plate 22 is attached to the plastic frame 12, and the dark light leakage phenomenon will be more serious due to a tensile force of the VHB 30.

Figure 2A:
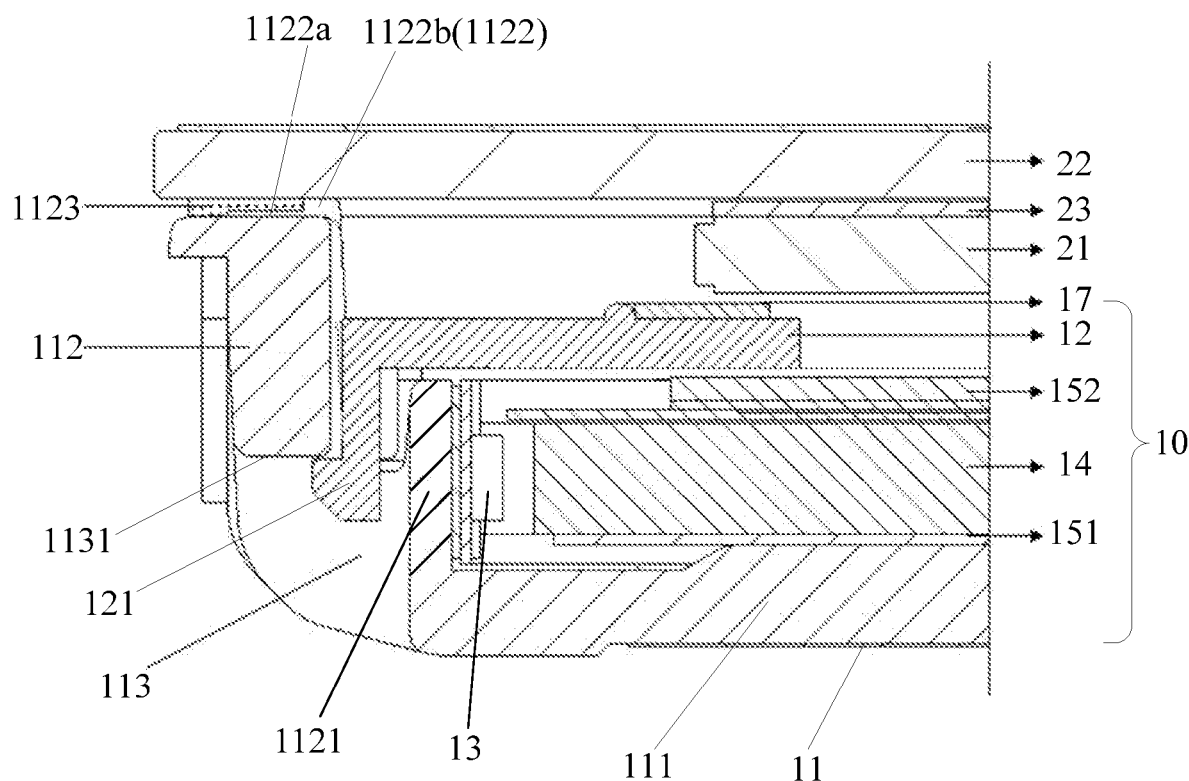
FIG. 2a is a schematic diagram of a local section structure of a display unit according to an exemplary embodiment of the present disclosure.
Figure 6A:
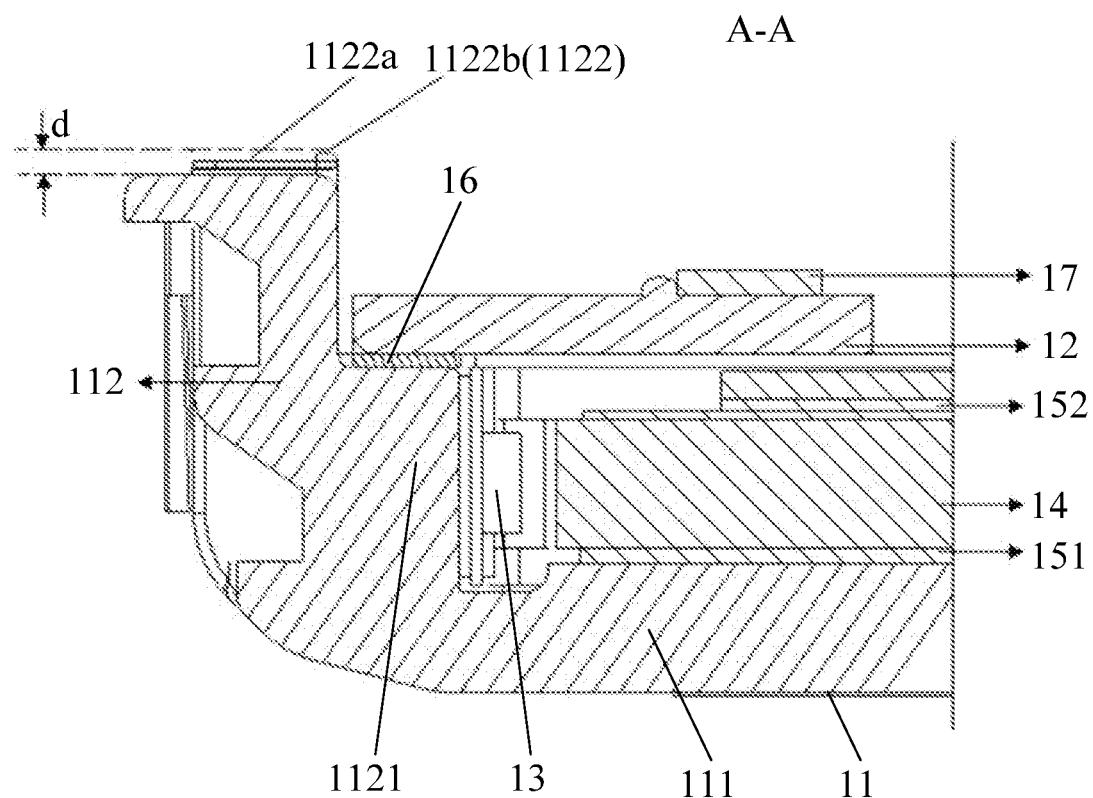
FIG. 6a is a schematic diagram of a cross-sectional structure of the back light unit at the position A-A in FIG. 5 in an example according to an embodiment of the present disclosure.

A back light unit provided by an embodiment of the present application is configured to be disposed on a side of a display panel away from a display side, to provide a light source for the display panel (e.g., a liquid crystal display panel), so that the display panel may display. As shown in FIG. 2a and FIG. 6a, FIG. 2a shows a schematic diagram of a local cross-sectional structure of a display unit configured with a back light unit according to an embodiment of the present disclosure in some exemplary embodiments, and FIG. 6a is a schematic diagram of another local cross-sectional structure of the back light unit according to an embodiment of the present disclosure. The back light unit 10 includes a back plate 11 and a plastic frame 12. The back plate 11 includes a bottom plate 111 and a side plate 112 connected to an edge of the bottom plate 111. A step 1121 is formed on an inner side of the side plate 112. The step 1121 has a first side away from the bottom plate 111 and a second side away from an outer side of the side plate 112. The plastic frame 12 is supported on the first side of the step 1121, and a supporting part 1122 is disposed on an end face of the side plate 112 away from the bottom plate 111, and the supporting part 1122 is configured to support the cover plate 22 disposed on the display side of the display panel 21.

As shown in FIG. 2a, the back light unit 10 of the embodiment of the present disclosure is configured to be disposed on the side of the display panel 21 away from the display side. The back plate 11 includes the bottom plate 111 and the side plate 112 connected to the edge of the bottom plate 111. The plastic frame 12 is disposed inside the side plate 112 of the back plate 111, and the supporting part 1122 is disposed on the end face of the side plate 112 away from the bottom plate 111. The supporting part 1122 is configured to support a cover plate 22 disposed on a display side of the display panel 21. Compared with a solution of supporting the cover plate 22 on the plastic frame 12, since the back plate 11 may be made of metal, a flatness of a surface of the supporting part 1122 configured to support the cover plate 22 may be smaller, which may provide a flatter supporting surface for the cover plate 22. Therefore, when the back light unit of the embodiment of the present disclosure is applied to a display unit (such as a liquid crystal display unit), the display panel 21 attached to the cover plate 22 will not be greatly deformed, thereby reducing a dark light leakage phenomenon.

In some exemplary embodiments, the back plate 11 may be made of metal, such as die-cast aluminum, and a flatness of a processed surface of the back plate 11 may be smaller when machining. Taking 12.8 inches as an example, the flatness of the back plate 11 may be <0.1 mm, while the flatness of the plastic frame 12 is usually <0.35 mm. In addition, a heat sink structure may be easily applicable to the back plate 11, which improves a heat dissipation effect and is suitable for the back light unit 10 with high brightness and high power. In addition, a complex positioning structure may be easily applicable to the back plate 11 to meet the whole assembly requirements of customers. A material of the plastic frame 12 may be organic plastic, such as polycarbonate resin (PC).

Figure 3:
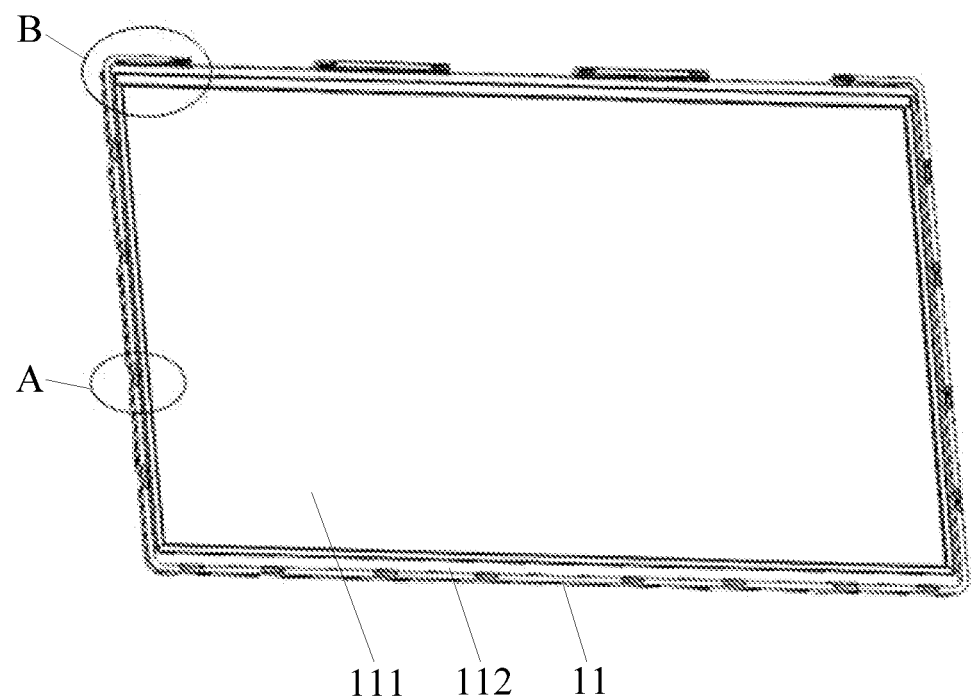
FIG. 3 is a schematic diagram of a structure of a back plate of a back light unit according to an embodiment of the present disclosure.
Figure 4A:
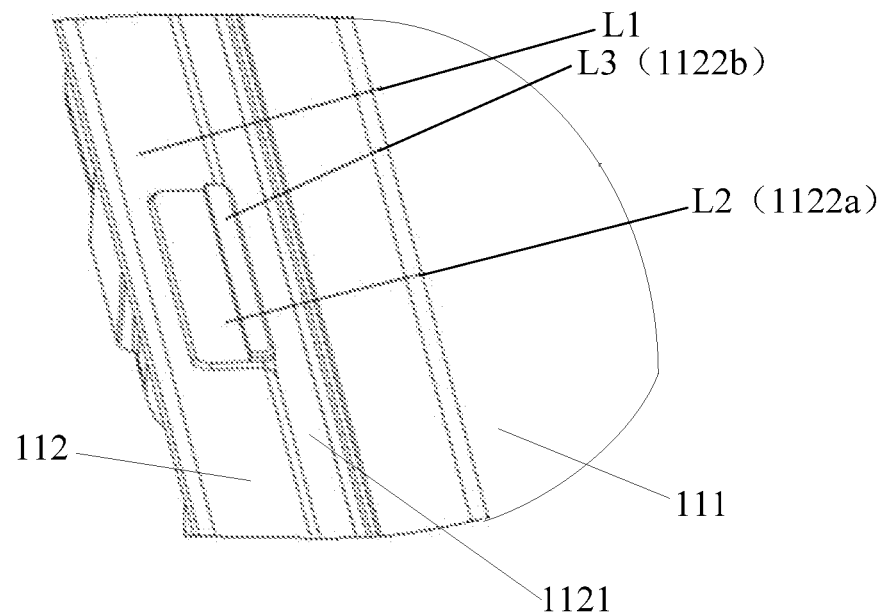
FIG. 4a is a schematic diagram of a locally enlarged structure at A in FIG. 3 in an example.
Figure 4B:
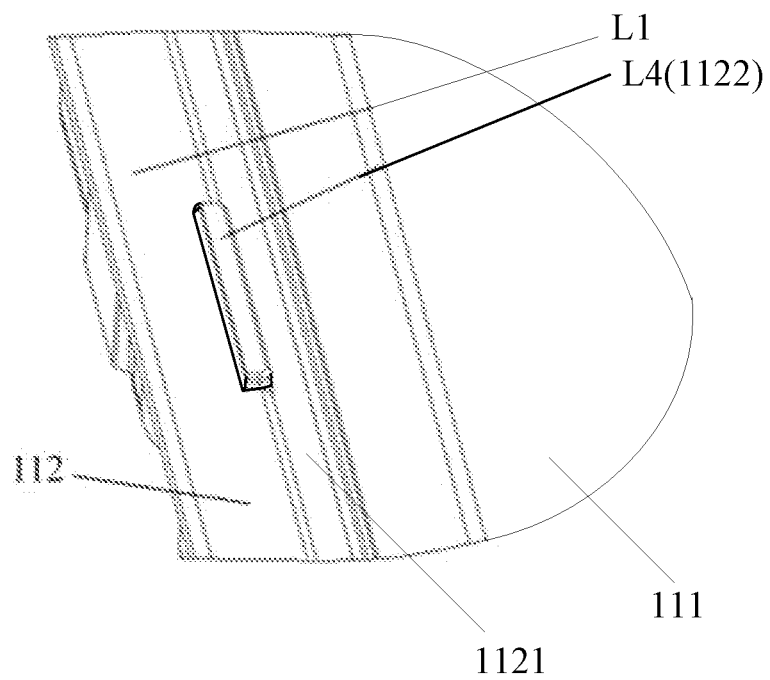
FIG. 4b is a schematic diagram of a locally enlarged structure at A in FIG. 3 in another example.
Figure 5:
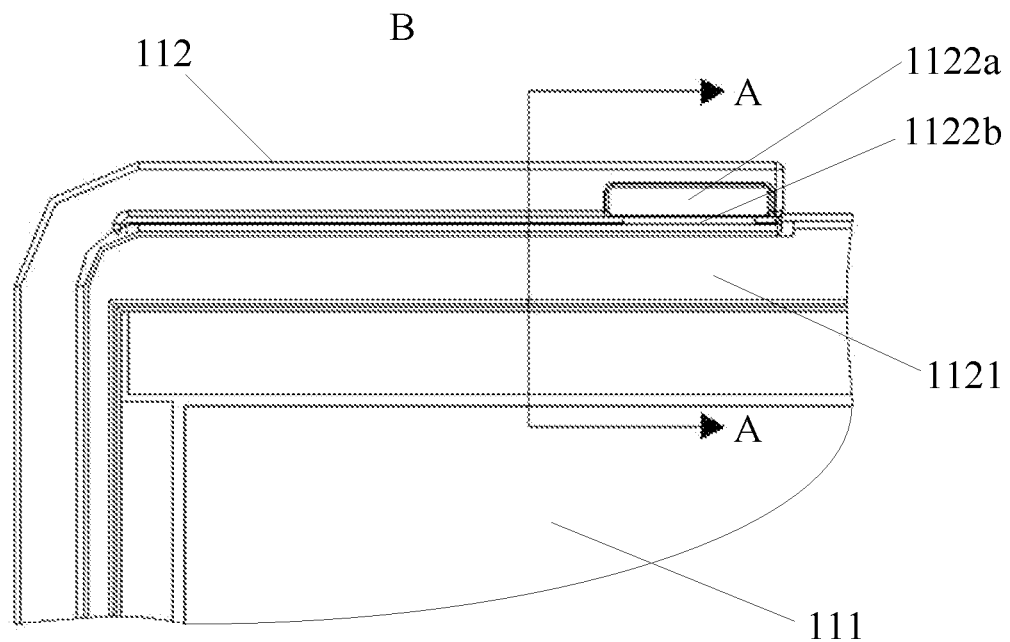
FIG. 5 is a partially enlarged structural diagram at B in FIG. 3 in an example.

In some exemplary embodiments, an end face of the side plate 112 away from the bottom plate 111 is provided with a plurality of bosses distributed along a circumferential direction of the side plate 112, which are integrated with the back plate 11, and the supporting part 1122 includes the plurality of bosses. In an example of the present embodiment, as shown in FIGS. 3-5, FIG. 3 shows a schematic diagram of a structure of the back plate 11, and FIGS. 4a and 5 are schematic diagrams of locally enlarged structures at A and B in FIG. 3, respectively. The back plate 11 includes the bottom plate 111 and the side plate 112 connected to the edge of the bottom plate 111. The side plate 112 is disposed along the circumferential edge of the bottom plate 111 and extends toward a side of the bottom plate 111. A shape of the bottom plate 111 may be adapted to a shape of the display panel 21, for example, rectangular. As shown in FIG. 4a, FIG. 5 and FIG. 6a, at least one of the bosses includes a first boss 1122a disposed on an end face of the side plate 112 away from the bottom plate 111 and a second boss 1122b disposed on the first boss 1122a. An end face of the side plate 112 away from the bottom plate 111 may be a first plane L1, and a surface of the first boss 1122a away from the bottom plate 111 may be a second plane L2 and a surface of the second boss 1122b away from the bottom plate 111 may be a third plane L3, and a surface (the third plane L3) of the second boss 1122b away from the bottom plate 111 is configured to support the cover plate 22 disposed on the display side of the display panel 21.

In an exemplary embodiment, the cover plate 22 may be supported on and in contact with the third plane L3 and may be adhered to the first plane L1 and the second plane L2 by a second adhesive layer 1123. The second adhesive layer 1123 may be an adhesive or a double-sided adhesive (such as VHB). For example, the cover plate 22 and the side plate 112 may be fixed by an adhesive dot-coated on the first plane L1 and the second plane L2, or the cover plate 22 and the side plate 112 may be fixed by a double-sided adhesive disposed on the first plane L1 and the second plane L2. Wherein, a height difference between the first plane L1 and the third plane L3 is a thickness d (shown in FIG. 6a) of the second adhesive layer 1123, and the height difference between the first plane L1 and the third plane L3 may be 0.3 mm-0.4 mm.

Figure 6B:
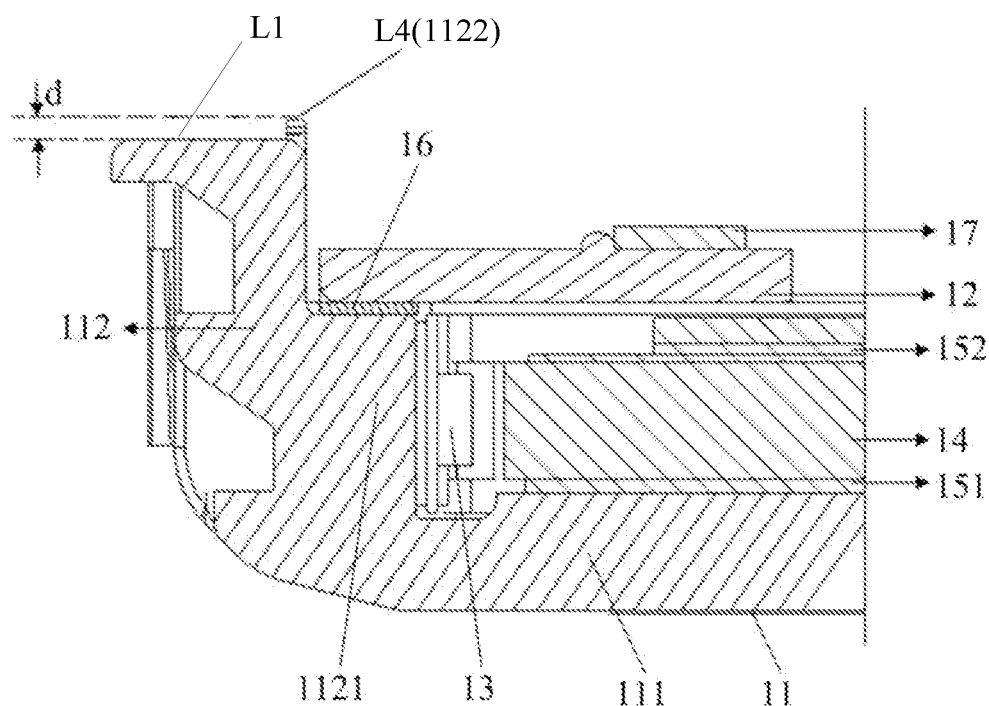
FIG. 6b is a schematic diagram of a cross-sectional structure of a back light unit in another an example according to an embodiment of the present disclosure.

In the examples of FIGS. 4a, 5, and 6a, an end surface of the side plate 112 away from the bottom plate 111 (i.e., the first plane L1) is provided with a plurality of bosses distributed along a circumferential direction of the side plate 112. The supporting part 1122 includes the plurality of bosses, at least one of the bosses includes a first boss 1122a and a second boss 1122b disposed on the first boss 1122a, a surface of the boss away from the bottom plate 111 includes a second plane L2 of the first boss 1122a and a third plane L3 of the second boss 1122b, and the third plane L3 is a supporting surface for the cover 22. In other examples, as shown in FIGS. 4b and 6b, an end surface of the side plate 112 away from the bottom plate 111 (i.e., the first plane L1) is provided with a plurality of bosses distributed along a circumferential direction of the side plate 112. A boss, the supporting part 1122 includes the plurality of bosses, and a surface of at least one of the bosses away from the bottom plate 111 is a plane, and the plane is a fourth plane L4 and is configured to support the cover plate 22, that is, the cover plate 22 is supported on the fourth plane L4, and the cover plate 22 is adhered to the first plane L1 of the side plate 112 through the second adhesive layer 1123. The second adhesive layer 1123 may be an adhesive or a double-sided tape (such as VHB), wherein a height difference between the first plane L1 and the fourth plane L4 is the thickness d of the second adhesive layer 1123, and the height difference between the first plane L1 and the fourth plane L4 may be 0.3 mm-0.4 mm. A surface of the side plate 112 in contact with the cover plate 22 may be processed by computer numerical control (CNC) to ensure a flatness of the surface of the side plate 112 in contact with the cover plate 22. In the present example, a flatness of the fourth plane L4 may be <0.1 mm.

In some exemplary embodiments, an end face of the side plate 112 away from the bottom plate 111 is provided with a first buffer layer, and the supporting part 1122 includes the first buffer layer. In this embodiment, the first buffer layer may be foam, which may increase a buffer between the cover plate 22 and the back plate 11, so as to avoid the risks of deformation, scratch or fracture of the cover plate 22 during vibration due to the hard contact surfaces of the both. However, because of the compression of foam when the cover plate 22 is attached to the back plate 11, a thickness tolerance of the whole display unit is relatively large, so an amount of glue used for bonding the cover plate 22 and the back plate 11 may be tried.

Figure 2B:
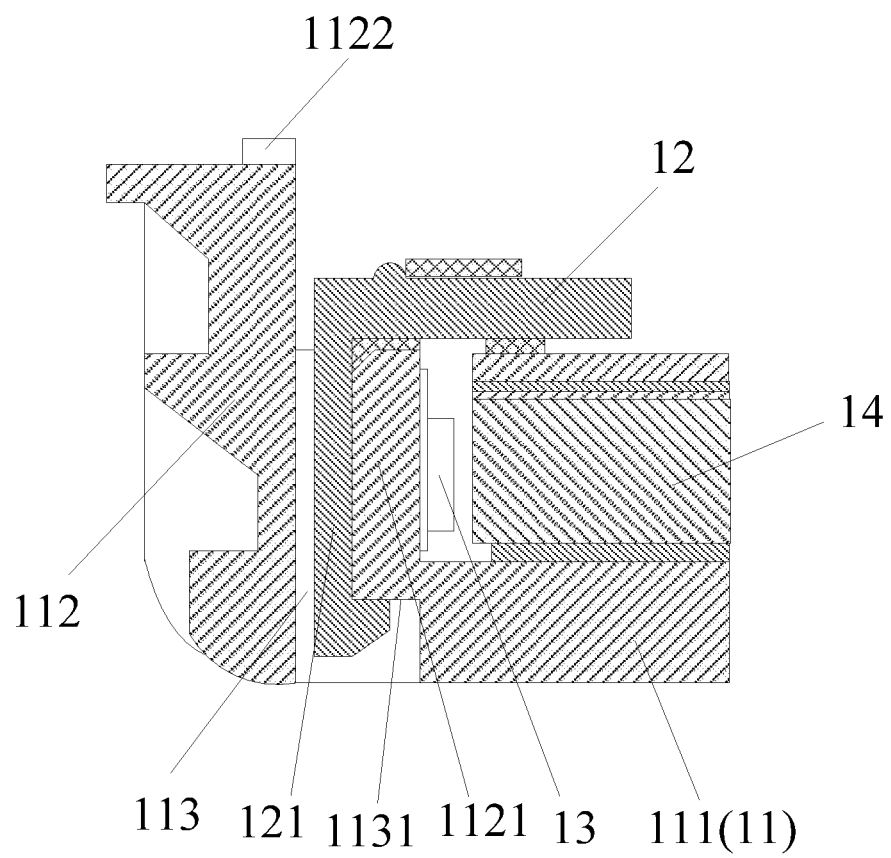
FIG. 2b is a schematic diagram of another local section structure of a back light unit according to an embodiment of the present disclosure.
Figure 7:
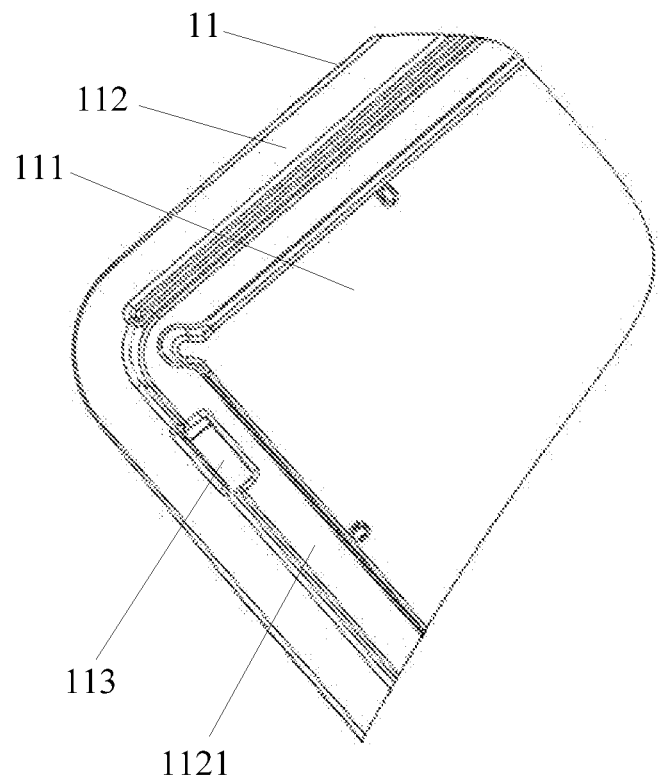
FIG. 7 is a schematic diagram of a local structure of a back plate of a back light unit in an example of an embodiment of the present disclosure.
Figure 8:
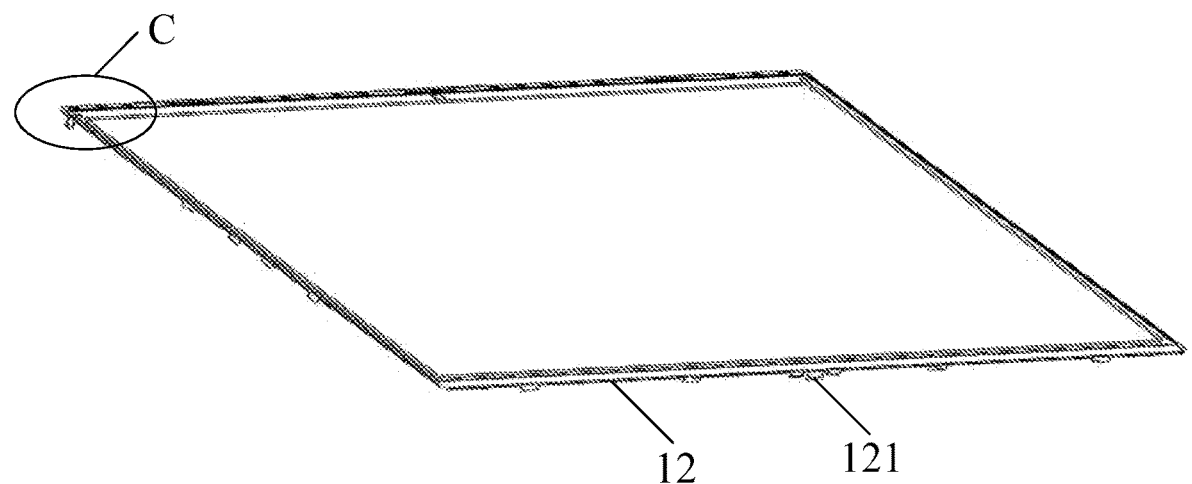
FIG. 8 is a schematic diagram of a structure of a plastic frame of a back light unit in an example of an embodiment of the present disclosure.
Figure 9:
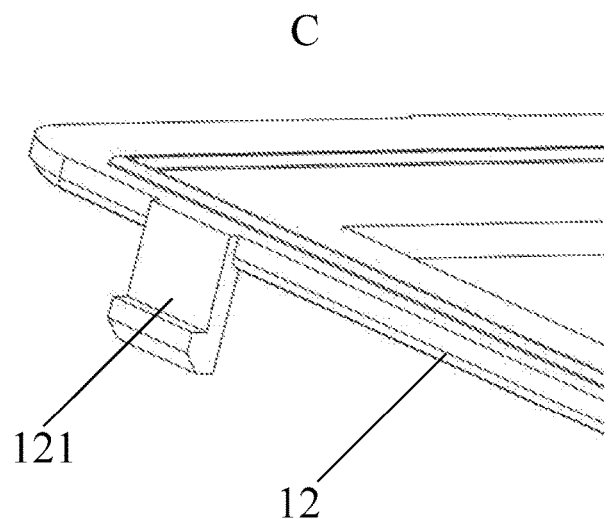
FIG. 9 is a schematic diagram of a locally enlarged structure at C in the plastic frame of FIG. 8.

In some exemplary embodiments, as shown in FIG. 6a, FIG. 6b and FIG. 7, the plastic frame 12 may be adhered to a first side of the step 1121 by a first adhesive layer 16; or/and, as shown in FIG. 2a and FIG. 2b, a side of the plastic frame 12 facing the bottom plate 111 is provided with a buckle 121, and the buckle 121 is clamped in a clamping hole 113 or a clamping groove disposed on the back plate 11. In this embodiment, the first adhesive layer 16 may be an adhesive or a double-sided tape. A circumferential edge of the plastic frame 12 facing the bottom plate 111 is adhered and fixed on a first side of the step 1121 by the first adhesive layer 16, and an inner edge of the plastic frame 12 protrudes from a second side of the step 1121. As shown in FIG. 8 and FIG. 9, a plurality buckles 121 may be disposed along the circumferential direction of the plastic frame 12, and a corresponding position of the back plate 11 is provided with the clamping hole 113 or the clamping groove. The coordination of the buckle 121 with the clamping hole 113 or the clamping groove may improve the fixed adhesion between the plastic frame 12 and the back plate 11. As shown in FIG. 2a, FIG. 2b, and FIG. 7, a shape of the buckle 121 is adapted to a shape of the clamping hole 113 or the clamping groove. Taking the coordination of the buckle 121 with the clamping hole 113 as an example, an end of the buckle 121 engaging in the clamping hole 113 is formed with a clamping part, which may protrude toward an inner side of the plastic frame 12 or toward an outer side of the plastic frame 12, and an end of the clamping hole 113 is located on a first side of the step 1121, and the other end penetrates the bottom plate 111 along a direction parallel to the side plate 112. The other end of the clamping hole 113 may form a clamping limiting platform 1131 on the bottom plate 111 or the side plate 112. When the buckle 121 is clamped in the clamping hole 113, the clamping part may be clamped at the clamping limiting step 1131 to prevent the buckle 121 from falling out of the clamping hole 113.

In some exemplary embodiments, as shown in FIGS. 2a and 2b, the back light unit 10 may further include a light source 13 and a light guide plate 14 fixed on the bottom plate 111, a light emitting surface of the light guide plate 14 is disposed away from the bottom plate 111, and the light source 13 is fixed on the second side of the step 1121 and located on a side of the light guide plate 14. In this embodiment, the light source 13 is fixed on the back plate 11. Compared with being fixed on the plastic frame 12, a heat conductivity of the back plate 11 is better than that of the plastic frame 12, so the whole display unit has good heat dissipation, which is applicable to the design of high-brightness and high-power display units. In this example, the light source 13 may be a led-bar of a light emitting diode (LED).

As shown in FIG. 2a, the back light unit 10 further includes a plurality optical diaphragms, which may include a reflection sheet 151 located between the light guide plate 14 and the bottom plate 111, and a diffusion sheet and a prism sheet 152 sequentially stacked on a side of the light guide plate 14 away from the bottom plate 111, and the prism sheet 152 may include a lower prism sheet and an upper prism sheet stacked on the diffusion sheet. The diffusion sheet is used to homogenize the light emitted from the light guide plate 14, and the prism sheet 152 is used to concentrate light emitted from the diffusion sheet in a display region of the display panel 21, which may improve the brightness of the display screen.

As shown in FIG. 2a, an embodiment of the present disclosure further provides a display unit, which includes a display panel 21, a cover plate 22 disposed on a display side of the display panel 21, and a back light unit 10 described in any of the aforementioned embodiments, wherein the back light unit 10 is disposed on a side of the display panel 21 away from the display side, and the cover plate 22 is supported on the supporting part 1122. When assembling, the display panel 21 may be attached to the cover plate 22 first, and then assembled with the back light unit 10. The display unit of the embodiment of the present disclosure may be a liquid crystal display unit and may be applied to a vehicle-mounted liquid crystal display apparatus.

In some exemplary embodiments, an end face of the side plate 112 away from the bottom plate 111 is provided with a plurality of bosses distributed along a circumferential direction of the side plate 112, which are integrated with the back plate 11, and the supporting part 1122 includes the plurality of bosses. In an embodiment, as shown in FIG. 4a, FIG. 5 and FIG. 6a, at least one of the bosses includes a first boss 1122a disposed on an end face of the side plate 112 away from the bottom plate 111 and a second boss 1122b disposed on the first boss 1122a. An end face of the side plate 112 away from the bottom plate 111 may be a first plane L1, a surface of the first boss 1122a away from the bottom plate 111 may be a second plane L2, and a surface of the second boss 1122b away from the bottom plate 111 may be a third plane L3 on which the cover plate 22 is supported and contacted, and the cover plate 22 may be adhered to the first plane L1 and the second plane L2 through a second adhesive layer 1123. The second adhesive layer 1123 may be an adhesive or a double-sided adhesive (such as VHB). For example, the cover plate 22 and the side plate 112 may be fixed by an adhesive dot-coated on the first plane L1 and the second plane L2, or the cover plate 22 and the side plate 112 may be fixed by a double-sided adhesive disposed on the first plane L1 and the second plane L2. Wherein, a height difference between the first plane L1 and the third plane L3 is a thickness d (shown in FIG. 6a) of the second adhesive layer 1123, and the height difference between the first plane L1 and the third plane L3 may be 0.3 mm-0.4 mm.

In the examples of FIGS. 4a and 5, an end surface of the side plate 112 away from the bottom plate 111 (i.e., the first plane L1) is provided with a plurality of bosses distributed along a circumferential direction of the side plate 112. The supporting part 1122 includes the plurality of bosses, at least one of the bosses includes a first boss 1122a and a second boss 1122b disposed on the first boss 1122a, a surface of the boss away from the bottom plate 111 includes a second plane L2 of the first boss 1122a and a third plane L3 of the second boss 1122b, and the third plane L3 is a supporting surface for the cover 22. In other examples, as shown in FIGS. 4b and 6b, an end surface of the side plate 112 away from the bottom plate 111 (i.e., the first plane L1) is provided with a plurality of bosses distributed along a circumferential direction of the side plate 112. A boss, the supporting part 1122 includes the plurality of bosses, and a surface of at least one of the bosses away from the bottom plate 111 is a plane, and the plane is a fourth plane L4 and is configured to support the cover plate 22, that is, the cover plate 22 is supported on the fourth plane L4, and the cover plate 22 is adhered to the first plane L1 of the side plate 112 through the second adhesive layer 1123. The second adhesive layer 1123 may be an adhesive or a double-sided tape (such as VHB), wherein a height difference between the first plane L1 and the fourth plane L4 is the thickness d of the second adhesive layer 1123, and the height difference between the first plane L1 and the fourth plane L4 may be 0.3 mm-0.4 mm. A surface of the side plate 112 in contact with the cover plate 22 may be processed by computer numerical control (CNC) to ensure a flatness of the surface of the side plate 112 in contact with the cover plate 22. In the present example, a flatness of the fourth plane L4 may be <0.1 mm.

In some exemplary embodiments, as shown in FIG. 2a, a side of the plastic frame 12 away from the bottom plate 111 is provided with a second buffer layer 17, which is disposed opposite to a circumferential edge of a side of the display panel 21 facing the bottom plate 111 and has a gap with the side of the display panel 21 facing the bottom plate 111. In the present embodiment, the second buffer layer 17 may be foam. The display panel 21 may be attached to the cover plate 22 through an optical adhesive (such as OCR or OCA, light-transmissive) layer 23, and a circumferential diaphragm of the cover plate 22 facing the side of the display panel 21 is supported on the side plate 112 of the back plate 11. There is a gap between the second buffer layer 17 and the display panel 21, in this way, when the display panel 21 is slightly deformed by an external force, it will not contact the plastic frame 12 and the second buffer layer 17, so as to prevent the display panel 21 from cracking. When the display panel 21 is greatly deformed, it will contact the second buffer layer 17, and the second buffer layer 17 may play a better role in buffering the display panel 21 compared with contacting the plastic frame 12.

An embodiment of the present disclosure further provides a display apparatus which includes the display unit described in any of the aforementioned embodiments. The display apparatus may be any product or component with a display function such as a mobile phone, a tablet computer, a television, a display, a laptop computer, a digital photo frame, a navigator, etc.

In the description of embodiments of the present disclosure, orientation or positional relationships indicated by terms "upper", "lower", "left", "right", "top", "inside", "outside", "axial", "corners"," and the like are based on the orientation or positional relationships shown in the drawings, and are for the purpose of ease of description of the embodiments of the present disclosure, but are not intended to indicate or imply that the mentioned structure have a specific orientation, or be constructed and operated in a particular orientation, and therefore they should not be construed as limitation to the present disclosure.

In the description of embodiments of the present disclosure, the terms "connection", "fixed connection", "installation" and "assembly" are to be understood broadly, for example, they may be fixed connection, or they may be detachable connection, or they may be integrally connected, unless explicitly specified and limited otherwise. The terms "installation", "connection" and "fixed connection" may be directly connected, or may be indirectly connected through an intermediate medium, or may be an internal connection between two elements. For those of ordinary skills in the art, the meanings of the above terms in embodiments of the present disclosure may be understood according to actual situations.

What we claim is:

1. A back light unit configured to be disposed on a side of a display panel away from a display side, comprising a back plate and a plastic frame, wherein:
   the back plate comprises a bottom plate and a side plate connected to an edge of the bottom plate,
   a step is formed on an inner side of the side plate,
   the step has a first side away from the bottom plate and a second side away from an outer side of the side plate,
   the plastic frame is supported on the first side surface of the step,
   a supporting part is disposed on an end surface of the side plate away from the bottom plate, and
   the supporting part is configured to support a cover plate disposed on the display side of the display panel;
   wherein an end face of the side plate away from the bottom plate is provided with a plurality of bosses distributed along a circumferential direction of the side plate,
   the plurality of bosses are integrated with the back plate, and
   the supporting part comprises the plurality of bosses.

2. The back light unit of claim 1, wherein:
   at least one of the bosses comprises a first boss disposed on an end face of the side plate away from the bottom plate and a second boss disposed on the first boss, and a surface of the second boss away from the bottom plate is configured to support the cover plate disposed on a display side of the display panel; or
   a surface of at least one of the bosses away from the bottom plate is a plane, and a surface of the boss away from the bottom plate is configured to support the cover plate disposed on the display side of the display panel.

3. The back light unit of claim 2, wherein
   the cover plate is adhered to the end face of the side plate away from the bottom plate through a second adhesive layer, and
   a thickness of the second adhesive layer is a height difference between the end face of the side plate away from the bottom plate and the surface of the boss away from the bottom plate.

4. The back light unit of claim 3, wherein the height difference between the end face of the side plate away from the bottom plate and the surface of the boss away from the bottom plate is 0.3 mm-0.4 mm.

5. The back light unit of claim 1, wherein
   the end face of the side plate away from the bottom plate is provided with a first buffer layer, and
   the supporting part comprises the first buffer layer.

6. The back light unit of claim 1, wherein:
   the plastic frame is adhered to a first side of the step through a first adhesive layer; or/and
   a side of the plastic frame facing the bottom plate is provided with a buckle, and the buckle is clamped in a clamping hole or a clamping groove disposed on the back plate.

7. The back light unit of claim 6, wherein
   a circumferential edge of the side of the plastic frame facing the bottom plate is adhered and fixed on the first side of the step through the first adhesive layer, and
   an inner edge of the plastic frame protrudes from a second side of the step.

8. The back light unit of claim 6, wherein:
   a plurality of buckles are disposed along the circumferential direction of the plastic frame,
   a corresponding position of the back plate is provided with a clamping hole or a clamping groove, and
   a shape of the buckle is matched with shapes of the clamping hole or the clamping groove.

9. The back light unit of claim 8, wherein:
   a clamping part is formed at an end of the buckle clamped into the clamping hole, and the clamping part protrudes toward an inner side or an outer side of the plastic frame;
   an end of the clamping hole is located on the first side of the step, and the other end penetrates through the bottom plate in a direction parallel to the side plate;
   a clamping limiting step is formed at the other end of the clamping hole on the bottom plate or side plate; and
   when the buckle is clamped in the clamping hole, the clamping part is clamped in the clamping limiting step.

10. The back light unit of claim 1, wherein
    the back light unit further comprises a light source and a light guide plate,
    the light guide plate is fixed on the bottom plate,
    a light emitting surface of the light guide plate is disposed away from the bottom plate, and
    the light source is fixed on the second side of the step and located on the side of the light guide plate.

11. The back light unit of claim 1, wherein
    the back light unit further comprises a plurality of optical diaphragms, the plurality of optical diaphragms comprise a reflection sheet located between the light guide plate and the bottom plate, a diffusion sheet and a prism sheet sequentially stacked on a side of the light guide plate away from the bottom plate, and the prism sheet comprises a lower prism sheet and an upper prism sheet stacked on the diffusion sheet.

12. The back light unit of claim 1, wherein the back plate is made of metal and the plastic frame is made of organic plastic.

13. The back light unit of claim 1, wherein the side plate is disposed along a circumferential edge of the bottom plate and extends toward a side of the bottom plate, and a shape of the bottom plate is matched with a shape of the display panel.

14. A display unit, comprising a display panel, a cover plate disposed on a display side of the display panel, and the back light unit of claim 1, wherein the back light unit is disposed on a side of the display panel away from the display side, and the cover plate is supported on the supporting part.

15. The display unit of claim 14, wherein an end face of the side plate away from the bottom plate is provided with a plurality of bosses distributed along a circumferential direction of the side plate, the plurality of bosses are integrated with the back plate, and the supporting part comprises the plurality of bosses; and the cover plate is in contact with a surface of the boss away from the bottom plate, and the cover plate is adhered to an end face of the side plate away from the bottom plate through a second adhesive layer.

16. The display unit of claim 15, wherein, at least one of the bosses comprises a first boss disposed on the end face of the side plate away from the bottom plate and a second boss disposed on the first boss, and a surface of the second boss away from the bottom plate is configured to support the cover plate disposed on the display side of the display panel, or a surface of at least one of the bosses away from the bottom plate is a plane, and a surface of the boss away from the bottom plate is configured to support the cover plate disposed on the display side of the display panel.

17. The display unit of claim 14, wherein a side of the plastic frame away from the bottom plate is provided with a second buffer layer, and the second buffer layer is disposed opposite to a circumferential edge of the side of the display panel facing the bottom plate, and has a gap with the side of the display panel facing the bottom plate.

18. A display apparatus, comprising the display unit of claim 14.

19. The display unit of claim 15, wherein a height difference between the surface of the boss away from the bottom plate and the end face of the side plate away from the bottom plate is 0.3 mm-0.4 mm.

* * * * *